United States Patent
Yu et al.

(10) Patent No.: US 10,542,545 B2
(45) Date of Patent: Jan. 21, 2020

(54) BEAM FAILURE RECOVERY MECHANISM FOR MULTI-BEAM OPERATION

(71) Applicant: MEDIATEK INC., Hsinchu (TW)

(72) Inventors: Chia-Hao Yu, Hsinchu (TW);
Yuanyuan Zhang, Beijing (CN);
Ming-Po Chang, Hsinchu (TW);
Jiann-Ching Guey, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/888,250

(22) Filed: Feb. 5, 2018

(65) Prior Publication Data

US 2018/0227899 A1 Aug. 9, 2018

Related U.S. Application Data

(60) Provisional application No. 62/455,522, filed on Feb. 6, 2017, provisional application No. 62/501,936, filed on May 5, 2017.

(51) Int. Cl.
*H04L 1/16* (2006.01)
*H04W 72/04* (2009.01)
(Continued)

(52) U.S. Cl.
CPC ........ *H04W 72/046* (2013.01); *H04B 17/318* (2015.01); *H04W 72/0413* (2013.01); *H04W 74/08* (2013.01)

(58) Field of Classification Search
None
See application file for complete search history.

(56) References Cited

U.S. PATENT DOCUMENTS

| 8,755,755 B2 | 6/2014 | Hoshino et al. ................ 455/69 |
| 8,767,875 B2 * | 7/2014 | Guo ..................... H04B 7/0434 |
| | | 375/299 |

(Continued)

FOREIGN PATENT DOCUMENTS

| CN | 105340132 A | 5/2014 |
| CN | 106255209 A | 2/2016 |

(Continued)

OTHER PUBLICATIONS

International Search Report and Written Opinion of International Search Authority for PCT/CN2018/075373 dated Apr. 23 28, 2018 (10 pages).

(Continued)

*Primary Examiner* — Sithu Ko
(74) *Attorney, Agent, or Firm* — Imperium Patent Works; Zheng Jin

(57) ABSTRACT

A method of beam failure recovery for multi-beam operation in wireless communication systems with beamforming is proposed. Specifically, a four-step beam failure recovery procedure is proposed. In a first step of beam failure detection, UE detects a beam failure condition of the original serving beam pair link. In a second step of new candidate beam identification, UE performs measurements for candidate beam selection. In a third step of beam failure recovery request (BFRQ) transmission, UE transmits a BFRQ message to BS upon the triggering condition for BFRQ transmission is satisfied. In a fourth step of monitoring BS response, UE monitors BS response to decide the success or failure of the beam failure recovery.

17 Claims, 5 Drawing Sheets

(51) Int. Cl.
*H04B 17/318* (2015.01)
*H04W 74/08* (2009.01)

(56) References Cited

U.S. PATENT DOCUMENTS

| | | | |
|---|---|---|---|
| 10,129,793 B2* | 11/2018 | Ryoo | H04W 24/08 |
| 10,237,045 B2* | 3/2019 | Liu | H04B 7/0617 |
| 2013/0155847 A1* | 6/2013 | Li | H04W 24/04 370/225 |
| 2014/0056256 A1 | 2/2014 | Kim et al. | 370/329 |
| 2015/0017979 A1 | 1/2015 | Kang et al. | 455/426.1 |
| 2015/0139116 A1 | 5/2015 | Wang et al. | 370/329 |
| 2015/0333811 A1 | 11/2015 | Yu et al. | 370/329 |
| 2016/0183232 A1 | 6/2016 | Stirling-Gallacher et al. | 370/280 |
| 2016/0353510 A1* | 12/2016 | Zhang | H04L 43/16 |
| 2017/0054534 A1 | 2/2017 | Sang et al. | 370/332 |
| 2017/0188379 A1 | 6/2017 | Shtrom et al. | 370/329 |
| 2017/0230849 A1 | 8/2017 | Wei et al. | |
| 2017/0346545 A1 | 11/2017 | Islam et al. | |
| 2018/0110066 A1* | 4/2018 | Luo | H04B 7/088 |
| 2018/0176801 A1 | 6/2018 | Rune | |
| 2018/0192443 A1* | 7/2018 | Novlan | H04W 74/006 |
| 2018/0219604 A1* | 8/2018 | Lu | H04B 7/0695 |
| 2018/0359790 A1 | 12/2018 | Ingale et al. | |
| 2018/0375556 A1 | 12/2018 | Wang et al. | |
| 2019/0174549 A1 | 6/2019 | Xu et al. | |

FOREIGN PATENT DOCUMENTS

| | | |
|---|---|---|
| WO | WO02013024942 A1 | 8/2011 |
| WO | WO2016011199 A1 | 7/2014 |
| WO | WO2016172840 A1 | 4/2015 |

OTHER PUBLICATIONS

Chen, Zhixuan et al., "3GPP RAN1 #88bis conference report", May 12, 2017 (no English translation is available).
USPTO, office action for related U.S. Appl. No. 16/043,718 (MDT-373) dated Sep. 4, 2019 (9 pp.).

* cited by examiner

BEAM FAILURE RECOVERY MECHANISM FOR MULTI-BEAM OPERATION

CROSS REFERENCE TO RELATED APPLICATIONS

This application claims priority under 35 U.S.C. § 119 from U.S. Provisional Application Number 62/455,522, entitled "Beam Recovery Mechanism for Multi-Beam Operation," filed on Feb. 6, 2017; U.S. Provisional Application Number 62/501,936, entitled "Method for Beam Management for Wireless Communication System with Beamforming," filed on May 5, 2017, the subject matter of which is incorporated herein by reference.

TECHNICAL FIELD

The disclosed embodiments relate generally to wireless communication, and, more particularly, to beam failure recovery mechanism in a Millimeter Wave (mmW) beamforming system.

BACKGROUND

The bandwidth shortage increasingly experienced by mobile carriers has motivated the exploration of the underutilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

In principle, beam training mechanism, which includes both initial beam alignment and subsequent beam tracking, ensures that base station (BS) beam and user equipment (UE) beam are aligned for data communication. To ensure beam alignment, beam-tracking operation should be adapted in response to channel changes. However, in mmWave systems, transmission path lifetime is expected one order of magnitude shorter than traditional cellular bands due to wavelength difference. Combined with dedicated beam with small spatial coverage, the number of effective transmission paths for a dedicated beam could be rather limited, thus more vulnerable to UE movements and environmental changes.

For beamformed access, both ends of a link need to know which beamformers to use. In downlink DL-based beam management, the BS side provides opportunities for UE to measure beamformed channel of different combinations of BS beams and UE beams. For example, BS performs periodic beam sweeping with reference signal (RS) carried on individual BS beams. UE can collect beamformed channel state by using different UE beams, and UE then report the collect information to BS. Apparently, UE has the most up-to-date beamformed channel state in DL-based beam management. BS learns the beamformed channel state based on UE feedback, and the feedback may include only strong beam pair links selected by UE.

The feedback rate for beamformed channel state is selected to take care of most beam tracking needed. A higher feedback rate for beamformed channel state provides more up-to-date information but at the cost of higher overhead. For rare cases beam tracking issue, however, such feedback rate for beam management may not be frequent enough. For example, a sudden blockage may result in lost connection. An additional mechanism is thus desired to address the need from rare cases.

SUMMARY

A method of beam failure recover for multi-beam operation in wireless communication systems with beamforming is proposed. Specifically, a four-step beam failure recovery procedure is proposed. In a first step of beam failure detection, UE detects a beam failure condition of the original serving beam pair link. In a second step of new candidate beam identification, UE performs measurements for candidate beam selection. Note that step 2 is not necessarily preceded by step 1. In a third step of beam failure recovery request (BFRQ) transmission, UE transmits a BFRQ message to BS upon the triggering condition for BFRQ transmission is satisfied. In a fourth step of monitoring BS response, UE monitors BS response to decide the success or failure of the beam failure recovery.

In one embodiment, a UE receives beam failure recovery configuration from a base station over an established data connection using a serving beam pair link in a beamforming communication network. The UE monitors a plurality of reference signals associated with different downlink beams based on the beam failure recovery configuration. The UE transmits a beam failure recovery request (BFRQ) message indicating a UE-identified candidate beam pair link to the base station when a triggering condition for beam failure recovery is satisfied. The UE monitors a response from the base station associated with the UE-identified candidate beam pair link.

In another embodiment, a base station (BS) transmits beam failure recovery configuration to a user equipment (UE) over an established data connection using a serving beam pair link in a beamforming communication network. The BS receives a beam failure recovery request (BFRQ) message indicating a UE-identified candidate beam pair link from the UE when a triggering condition for beam failure recovery is satisfied. The BS transmits a response to the UE. The response is associated with the UE-identified candidate beam pair link.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
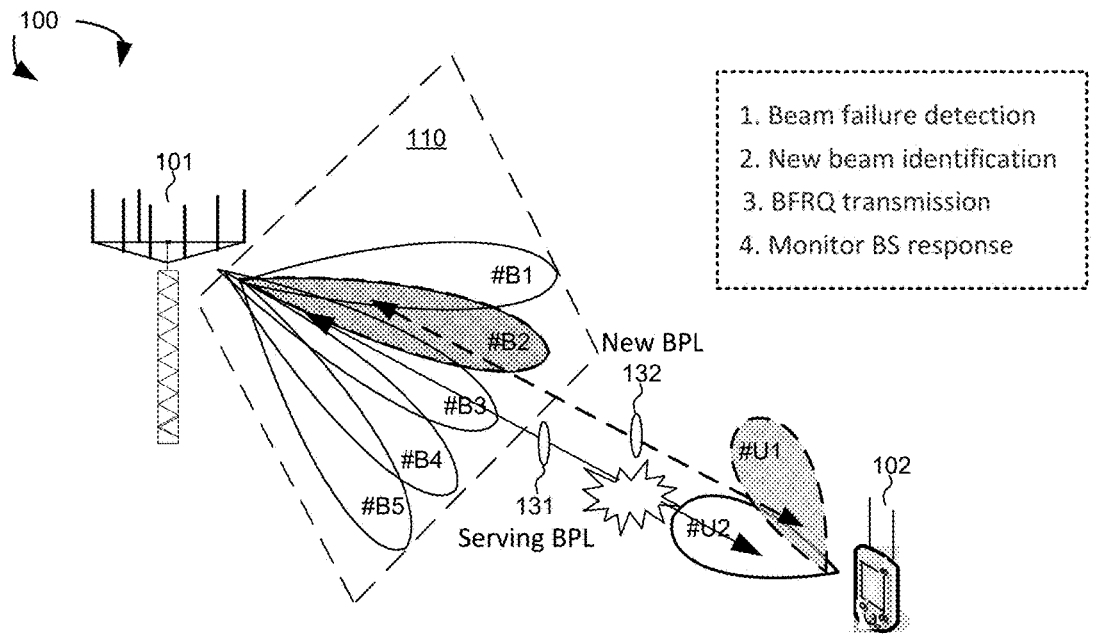
FIG. 1 illustrates a beamforming wireless communication system supporting a four-step beam failure recovery procedure in accordance with one novel aspect.

FIG. 1 illustrates a beamforming wireless communication system 100 supporting a four-step beam failure recovery procedure in accordance with one novel aspect. Beamforming mmWave mobile communication network 100 comprises a base station BS 101 and a user equipment UE 102. The mmWave cellular network uses directional communications with beamformed transmission and can support up to multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple cells, and each cell is covered by a set of TX/RX beams. For example, cell 110 is covered by a set of five BS beams #B1, #B2, #B3, #B4, and #B5. The collection of the BS beams #B1-#B5 covers an entire service area of cell 110. Similarly, UE 102 may also apply beamforming to form multiple UE beams, e.g., #U1 and #U2.

The set of BS beams may be periodically configured or occur indefinitely and repeatedly in order known to the UEs. Each BS beam broadcasts minimum amount of cell-specific and beam-specific information similar to System Information Block (SIB) or Master Information Block (MIB) in LTE systems. Each BS beam may also carry UE-specific control or data traffic. Each BS beam transmits a set of known reference signals for the purpose of initial time-frequency synchronization, identification of the beam that transmits the signals, and measurement of radio channel quality for the beam that transmits the signals. In one example, a hierarchical control beam and dedicated data beam architecture provides a robust control-signaling scheme to facilitate the beamforming operation in mmWave cellular network systems.

In principle, beam training mechanism, which includes both initial beam alignment and subsequent beam tracking, ensures that BS beam and UE beam are aligned for data communication. For beamformed access, both ends of a link need to know which beamformers to use, e.g., a beam pair link (BPL). In downlink(DL)-based beam management, the BS side provides opportunities for UE to measure beamformed channel of different combinations of BS beams and UE beams. Apparently, UE has the most up-to-date beamformed channel state in DL-based beam management. BS learns the beamformed channel state based on UE feedback. The feedback rate for beamformed channel state is selected to take care of most beam tracking need. For rare cases beam tracking issue, however, such feedback rate for beam management may not be frequent enough. For example, a sudden blockage may result in lost connection. An additional mechanism is thus desired to address the need from rare cases.

In according with one novel aspect, a four-step beam failure recovery procedure from UE perspective is proposed. In a first step of beam failure detection, UE 102 detects a beam failure condition of the original serving BPL 131 formed between BS beam #B3 and UE beam #U2. In a second step of new candidate beam identification, UE 102 performs measurements for candidate beam selection. Note that step 2 is not necessarily preceded by step 1. In a third step of beam failure recovery request (BFRQ) transmission, UE 102 transmits a BFRQ message to BS 101 upon the triggering condition for BFRQ transmission is satisfied. For example, the triggering condition is satisfied when beam failure is detected (e.g., the quality of the serving BPL is worse than a first predefined threshold) and candidate beam is identified (e.g., the quality of the candidate BPL is better than a second predefined threshold). In a fourth step of monitoring BS response, UE 102 monitors BS response to decide the success or failure of the BFRQ transmission attempt. For example, if the BFRQ transmission attempt is successful, then a new BPL 132 formed between BS beam #B2 and UE beam #U1 is selected to become the new serving BPL between BS 101 and UE 102.

Figure 2:
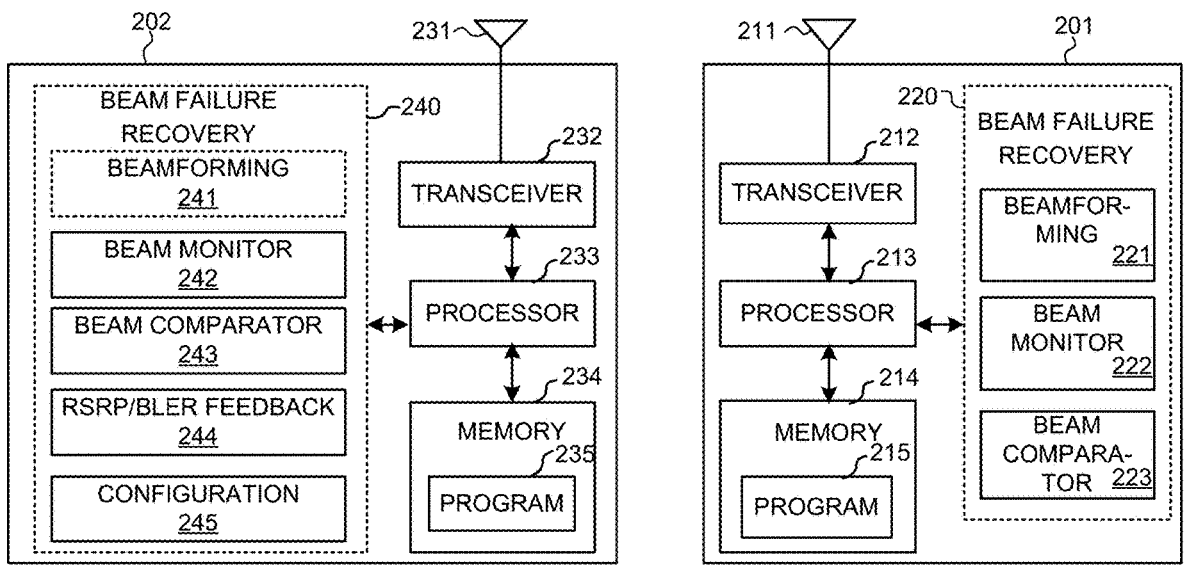
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. For example, BS 201 comprises a beam failure recovery module 220, which further comprises a beamforming circuit 221, a beam monitor 222, and a beam comparator 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Beam comparator 223 compares the beam monitoring results for each beam and determines BPL alignment status.

Similarly, UE 202 comprises a beam failure recovery module 240, which further comprises a beamforming circuit 241, a beam monitor 242, a beam comparator 243, a RSRP/BLER feedback circuit 244, and a configuration circuit 245. Beamforming circuit 241 may belong to part of the RF chain, which applies various beamforming weights to multiple antenna elements of antenna 231 and thereby forming various beams. Beamforming circuit 241 is optional for UE side, because UE 202 can use omni beam instead. Beam monitor 242 monitors received radio signals and performs measurements of the radio signals over the various beams. Beam comparator 243 compares the beam monitoring results for each beam and maintains a ranking of its preferred BPLs. RSRP/BLER feedback circuit 244 provide beam quality feedback information to BS 201 for BPL alignment status determination. Configuration circuit 245 receives beam failure recovery configuration from BS 201, which includes beam failure recovery trigger condition, beam failure recovery resources, and UE monitoring behavior.

Figure 3:
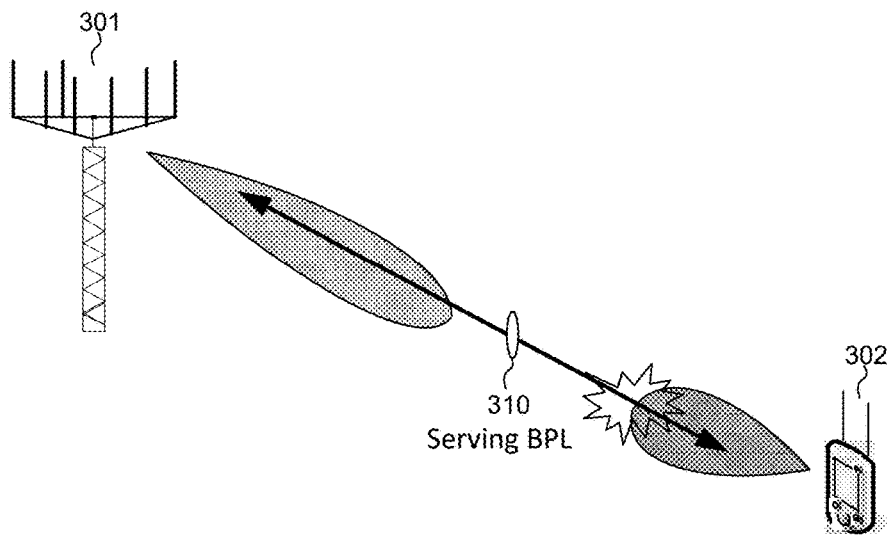
FIG. 3 illustrates a first step of serving beam pair link (BPL) and beam failure detection in a beam failure recovery procedure.

FIG. 3 illustrates a first step of serving control beam pair link (BPL) beam failure detection in a beam failure recovery procedure. In the example of FIG. 3, BS 301 is a serving base station for UE 302 and establishes a serving beam pair link BPL 310 with UE 302 for data communication. Preferably, the serving BPL is associated to control channel beam, e.g., physical downlink control channel (PDCCH). One triggering condition for beam failure recovery is a beam failure detection of the serving BPL. Note that more than one serving BPLs may be used as serving control channels between the BS and the UE. In such case, preferably beam failure recovery is triggered when all serving control channel fails. In one example, the beam failure is detected when the Block Error Rate (BLER) of the serving BPL (e.g., PDCCH) is worse than a predefined threshold. For UE, only periodic channel state information reference signal (CSI-RS) or synchronization signal block (SSB) which is spatially quasi-collocated (QCL'ed) with control channel (e.g., PDCCH) demodulation reference signal (DMRS) is used for beam failure detection.

Figure 4:
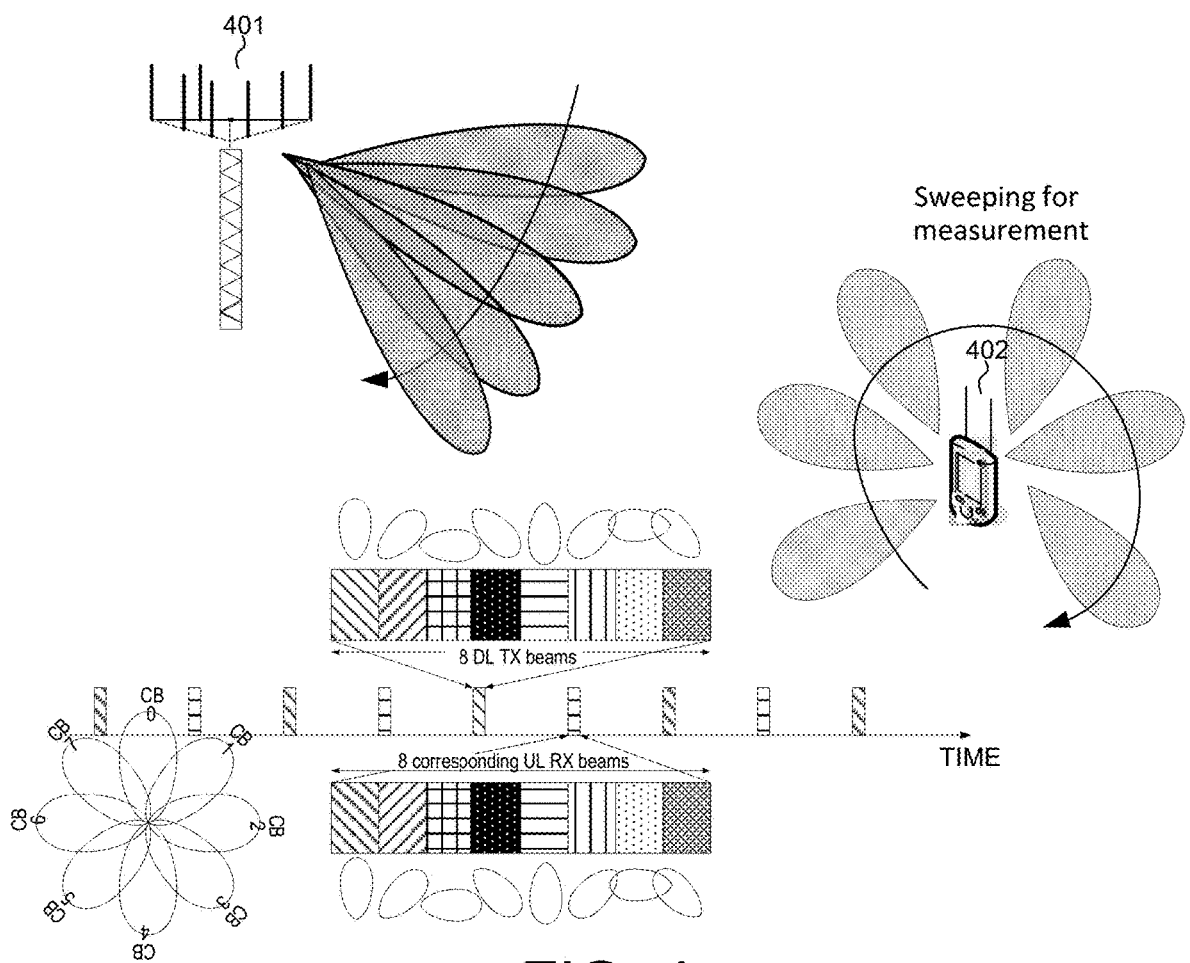
FIG. 4 illustrates a second step of beam monitoring and new beam identification in a beam failure recovery procedure.

FIG. 4 illustrates a second step of beam monitoring and new beam identification in a beam failure recovery procedure. In the example of FIG. 4, BS 401 is a serving base station for UE 402. Another triggering condition for beam failure recovery is a candidate beam monitoring and new beam identification. In general, UE monitoring behavior follows similar procedure as DL beam management procedure in multi-beam operation. Beam identification RS includes periodic CSI-RS for beam management if configured by the network, or periodic CSI-RS and SS-blocks within the serving cell, if SS-block is also used in beam management and is configured by the network as beam failure detection reference signal(s) as well. Periodic RS is transmitted from individual BS beams to provide periodic opportunities for UE to access individual BPLs. The reference signal can be beam-specific. Similarly, aperiodic reference signal can also be used to assist beam quality information collection at UE. The reference signal is beam-specific, i.e., UE can differentiate the reference signals. The beam set used for aperiodic RS transmission may not be the same as the periodic RS beam set.

As depicted by FIG. 4, BS 401 transmits periodic DL RS by using a set of provisioned BS control beams CB0-CB8 with moderate beamforming gain. Individual beam-specific reference signals are transmitted in TDM/FDM/CDM manner or a combination of them. UL opportunities that include random access resources in a set of BS UL beams are illustrated as well. UE monitors the quality of combinations of BS-UE BPLs in background by sweeping through different beams. The quality is measured based on UE-specifically configured CSI-RS resources and/or SS-blocks resources. The measurement metric for candidate beam selection is layer-1 reference signal received power (L1-RSRP). An RRC parameter is introduced to configure the threshold value for L1-RSRP based on CSI-RS. Another threshold can be implicitly derived for L1-RSRP based on SSB. A new BPL is identified when the L1-RSRP of the new BPL is above a predefined threshold. UE keeps a ranking of its preferred BPLs and can later select from the preferred BPLs that are not currently used for communication for beam failure recovery purpose.

Figure 5:
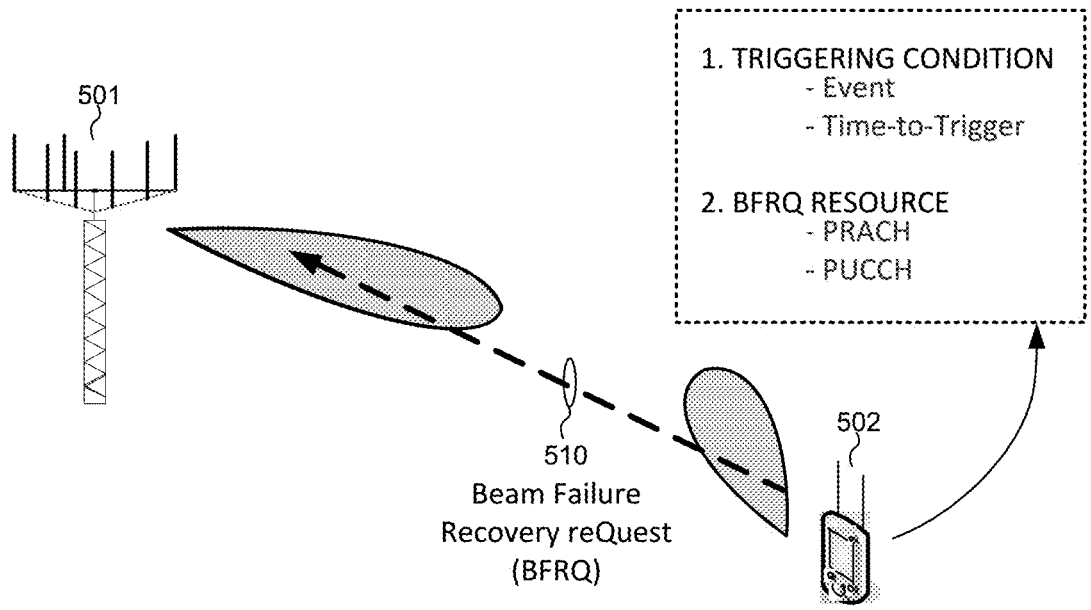
FIG. 5 illustrates a third step of triggering condition and beam failure recovery request transmission in a beam failure recovery procedure.

FIG. 5 illustrates a third step of triggering condition and beam failure recovery request (BFRQ) transmission in a beam failure recovery procedure. The BFRQ transmission involves two aspects, the first is the trigger condition, and the second is the selection of BFRQ resources. Triggering UE-initiated transmission for beam failure recovery requires UE to monitor both serving BPL(s) and good BPL currently not used for communication. In case more than one serving BPLs are used, beam failure recovery is triggered when all serving BPLs are lost. Both absolute and relative thresholds similar to RRC measurement events can be used. The considered events include Event R1 (candidate becomes offset better than serving and serving becomes worse than threshold); Event R2 (candidate becomes offset better than serving and candidate becomes better than threshold); Event R3 (serving becomes worse than threshold); Event R4 (serving becomes worse than threshold1 and candidate becomes better than threshold2). In a preferred embodiment, the triggering condition for beam failure recovery is satisfied when the serving is worse than a first threshold and the candidate is better than a second threshold. Note that if the threshold for serving BPL failure is predefined, then other events control conditions on candidate BPL only.

Time-to-trigger can be applied for event evaluation, i.e., event criteria should be satisfied for a certain amount of time before triggering beam failure recovery request. It is noted that time-to-trigger concept can be applied separately for beam failure detection evaluation and/or candidate beam identification. This event evaluation may not involve RRC filter, i.e., in Layer-2 or Layer-1. Timer-to-trigger can be implemented in the form of counter, where an indication is generated to inform a judging entity if a threshold has been met for an interval of time and a counter counts the number of positive or negative indication to decide if a trigger condition is met or not. The counter can be a layer-2 implementation, e.g., MAC layer. Timer-to-trigger can be implemented in the form of filtering, e.g., sliding window, where a signal representing a concerned beam quality is input to the filter. A filtering window can correspond to an evaluation period (e.g., a pre-defined length). In every interval that is shorter than the evaluation period, trigger condition is examined.

Once the triggering condition is satisfied for a predefined evaluation period, UE 502 transmits a Beam Failure Recovery reQuest (BFRQ) 510 to BS 501 over beam failure recovery resources. In a first embodiment, UE 502 is configured with beam failure recovery resources in Physical Random-Access Channel (PRACH) symbols. Beam failure recovery resources are dedicated resources, e.g., transmission behavior can reuse contention-free RACH transmission. The dedicated resources exist for individual RACH slots correspond to individual BS receiving beams. The dedicated resource may differentiate recovery events, i.e., different dedicated resources are mapped to different recovery events. Selection of beam failure recovery resources is based on UE's preference on BS DL beam with which to recover at least DL BS-UE communication. For example, UE 502 can select candidate BPL from the list of preferred BPLs. Thus, upon reception of the BFRQ 510, BS 501 knows UE's preference on BS DL beam and can use this beam for communicating with UE 502. The selected BPL can be associated with dedicated beam failure recovery resources directly or indirectly. For example, at least a subset beam set from beam management is configured with dedicated beam failure recovery resources, e.g., UE-specific signaling. Alternatively, at least a subset beam set from beam management is associated with SS-blocks. The RACH resources associated with SS-blocks can thus be used for beam failure recovery purpose. For example, if the selected candidate BPL corresponds to a CSI-RS resource which in turn is associated with a SS-block, then RACH resources associated with the SS-block can be used for beam failure recovery purpose.

With BS beam correspondence, UE selects a beam failure recovery resource from a resource set corresponding to the preferred BS DL beam for beam failure recovery transmission. The resource set reception at BS side uses a correspondent beam of the preferred BS DL beam. Without BS beam correspondence, UE selects multiple beam resources from multiple resource sets for beam failure recovery transmission. Individual resource sets are received with respective BS beams via BS RX sweeping. The aggregated angular coverage of the respective BS beams is the same as the aggregated angular service coverage for RACH transmission monitoring at BS, preferably. As for UE beam used for BFRQ transmission, with UE beam correspondence, the UE beam for UL beam BFRQ transmission is selected as the correspondent beam of UE DL beam of the preferred BPL. Without UE beam correspondence, a UE beam set are used subsequently for UL BFRQ transmission of the selected beam failure recovery resources. In one example, the UE beam set provides an aggregated angular coverage that is the same as a predefined desired UE angular coverage. In another example, the UE beam set is constrained by the UE DL beam of the preferred BPL, and its aggregated angular coverage is a subset of the predefined UE angular coverage. Each UE beam in the UE beam set are used to transmit on all the selected beam failure recovery resources. In each round of BFRQ transmission, i.e., request transmission on all the selected beam failure recovery resources, UE can fix its UE beam accordingly. UE monitors the network (NW) reaction after each round of BFRQ transmission.

Retransmission of BFRQ can be preconfigured or predefined if no NW reaction is identified. Retransmission may take place in dedicated resources that correspond to another candidate BPL. If beam failure recovery procedure based on dedicated resources fails, initial access procedure can be further used, i.e., contention-based RACH procedure is used to attempt to re-establish connection. Initial access procedure is based on SS-blocks measurement. Selected RACH resource corresponds to a SS-block without dedicated resource configuration for beam failure recovery request transmission. Unsuccessful recovery from beam failure can be declared if connection with NW cannot be maintained either on the preferred BPL or on the serving BPL. In one example, UE does not identify NW reaction for a certain amount of time after BFRQ transmission and the number of BFRQ transmission has reached a maximum pre-defined or pre-configured value, and optionally the above-mentioned contention-based RACH fails to recover the connection neither. In another example, UE performs BFRQ retransmission if UE does not identify NW reaction for a certain amount of time (e.g., based on a timer T1, the timer T1 may change its length based on the number of retransmissions that have taken place). After a maximum pre-defined/configured number of retransmissions, unsuccessful recovery from beam failure is declared if UE still does not identify NW reaction for another amount of time (e.g., based on a timer T2), and optionally the above-mentioned contention-based RACH fails to recover the connection neither. Furthermore, unsuccessful recovery from beam failure can be indicated to higher layer for further action if all means fail.

In a second embodiment, UE 502 is configured with dedicated beam failure recovery resource, e.g., UL control channel similar to LTE PUCCH. The dedicated resources correspond to individual BS receiving beams, e.g., individual PUCCHs for individual BS receiving beams for a UE. The dedicated resources carry information required for beam failure recovery action, e.g., DL BS beam ID of candidate BPL where beam failure recovery is to take place, triggered event (if multiple recovery events are configured), and candidate beam quality information. Selection of the dedicated resources for beam failure recovery request transmission is related to BS beam correspondence. With BS beam correspondence, the selected dedicated resource can be mapped to a BS UL beam that is beam-correspondent to the desired BS DL beam (the desired BS DL beam corresponds to the UE-selected candidate BPL). Without BS beam correspondence, all the dedicated resources are used to send beam failure recovery requests in turn. Individual dedicated resources are mapped to individual BS receiving beams (for BS receive beam sweeping). Upon reception of beam failure recovery request, BS knows the desired BS DL beam. Similar to the first embodiment, selected candidate BPL can be associated with dedicated beam failure recovery resources directly/indirectly. UE beam used for BFRQ transmission depends on UE beam correspondence. Retransmission of BFRQ is allowed and can be preconfigured or predefined if no NW reaction is identified.

Figure 6:
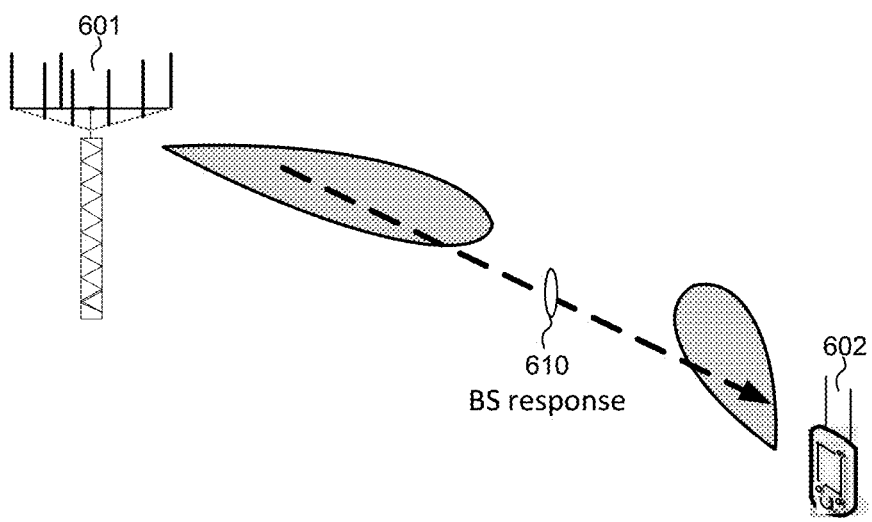
FIG. 6 illustrates a forth step of monitoring base station response and decide beam failure recovery in a beam failure recovery procedure.

FIG. 6 illustrates a forth step of monitoring base station response. Upon beam failure recovery request reception by BS 601, the network (NW) can decide to maintain the communication either on the serving BPL or on the UE-indicated candidate BPL by transmitting NW reaction (or equivalently, BS response) 610 to UE 602. If serving BPL is considered operational, NW can 1) trigger aperiodic measurement and corresponding reporting in serving BPL or in UE-indicated BPL; 2) trigger beam switching from serving BPL or UE-indicated BPL; or 3) start dedicated transmission in the UE-indicated BPL. NW reaction can be transmitted in an Random-Access Response (RAR, thus a MAC control element is received), or in dedicated data channel (whose resource allocation is indicated by a dedicated control channel scrambled by a UE-specific identity, for example, Cell-Radio Network Temporary Identifier (C-RNTI)) in serving BPL.

If serving BPL is considered not operational, NW attempts connection with UE in UE-indicated BPL. Through the content of NW reaction, the network can 1) trigger an aperiodic measurement and corresponding reporting in the UE-indicated beam pair link; 2) start dedicated transmission in the UE-indicated BPL; or 3) trigger beam switching from UE-indicated BPL. NW reaction can be transmitted in an Random-Access Response (RAR, thus a MAC control element is received), or in dedicated data channel (whose resource allocation is indicated by a dedicated control channel scrambled by a UE-specific identity, for example, C-RNTI) in the UE-indicated BPL.

UE behavior on monitoring NW reaction can be similar to monitoring RA Response if the BFRQ is transmitted in RACH symbols. For example, UE 602 monitors RAR for BS response 610 using a preconfigured or predefined time window. UE behavior on monitoring NW reaction can also be similar to monitoring DL control channel. For example, to receive BS response 610 for BFRQ, UE 602 monitors PDCCH with the assumption that the corresponding PDCCH DM-RS is spatial QCL'ed with RS of the UE-identified candidate beam(s). The BS response 610 is transmitted by BS 601 via a PDCCH addressed to C-RNTI of UE 602. Dedicated CORESET(s) is applied for monitoring BS response for BFRQ. Beam failure recovery success can be declared if NW reaction is identified by UE. Beam failure recovery success can be indicated to higher layer for further action. It is noted that the above mentioned behavior can be applied for different transmission channels for NW reaction. For example, the concept of an observation window for NW reaction can be used for monitoring a C-RNTI scrambled PDCCH as well.

Figure 7:
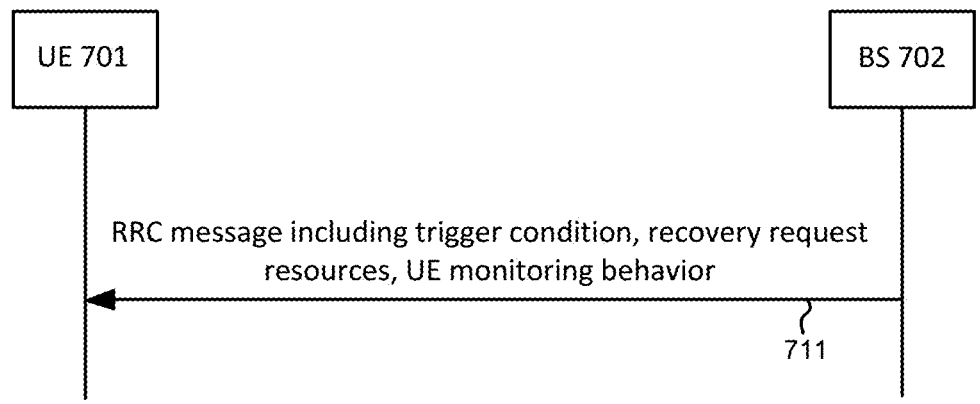
FIG. 7 illustrates beam failure recovery configuration for UE-initiated beam failure recovery procedure.

FIG. 7 illustrates beam failure recovery configuration for UE-initiated beam failure recovery procedure. In step 711, UE 701 receives an RRC message from BS 702 for beam failure recovery configuration. The beam failure recovery configuration may contain (not exhaustive) 1) beam failure recovery trigger condition for UE—active recovery events and related values e.g. thresholds, offsets; 2) beam failure recovery resources—dedicated resources for sending BFRQ in UL and UE BFRQ transmission behavior e.g. maximum number of retransmission, timer value for retransmission and/or for declaring beam failure recovery failure; and 3) NW reaction monitoring behavior at UE—monitor NW reaction on serving beam pair link, or on UE-indicated beam pair link, or on both, and actions treated as NW reaction to BFRQ e.g. aperiodic measurement reporting, beam switching command, and dedicated data.

Figure 8:
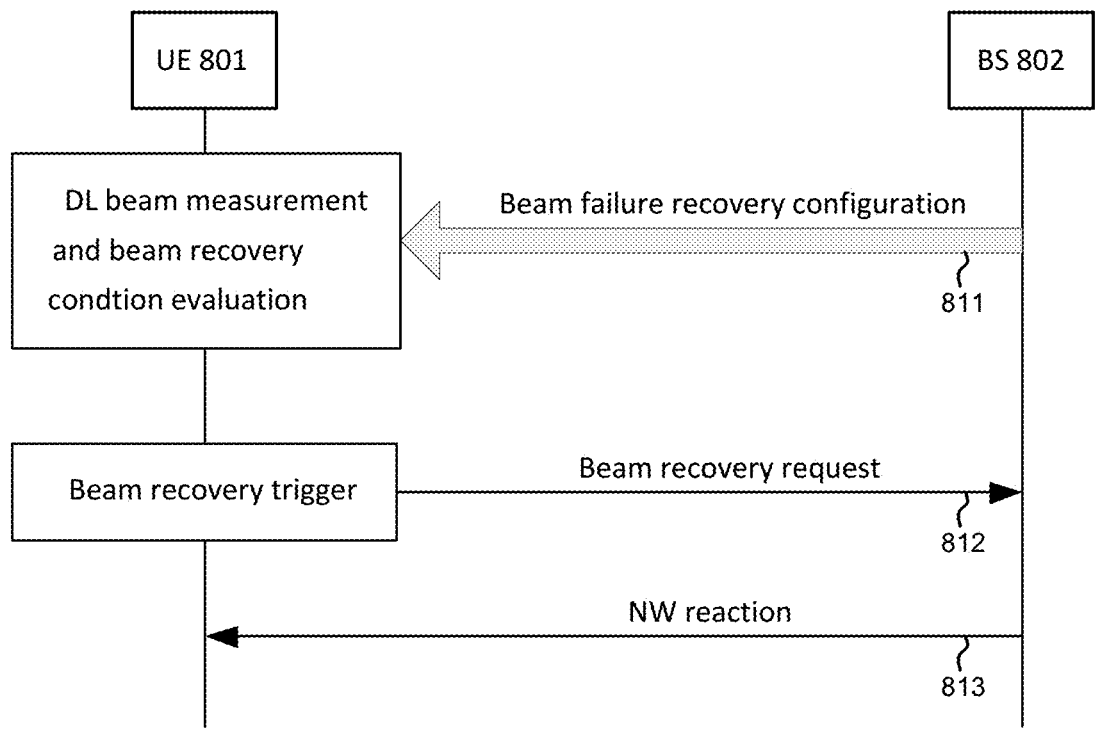
FIG. 8 illustrates a sequence flow of beam failure recovery procedure in accordance with one novel aspect of the present invention.

FIG. 8 illustrates a sequence flow of beam failure recovery procedure in accordance with one novel aspect of the present invention. In step 811, UE 801 receives configuration for beam failure recovery from BS 802. UE 801 performs DL beam measurement and beam failure recovery condition evaluation. If beam failure recovery trigger condition is met, then in step 812, UE 801 transmits BFRQ to BS 802. In step 813, BS 802 transmits NW reaction to UE 801. UE 801 determines NW reaction of the transmitted BFRQ. UE 801 monitors NW reaction based on beam failure recovery configuration on predefined targets, e.g., serving BPL, UE-indicated BPL, or both serving BPL and UE-indicated BPL. UE 801 then determines positive NW reaction based on triggering of aperiodic measurement reporting, DL beam switching command, triggering of UL transmission on UE-indicated BPL, and dedicated DL data transmission on UE-indicated BPL. If NW reaction is considered positively identified, UE follows NW's indication. If NW reaction is not identified according to configured monitoring behavior, further UE reaction is taken. For example, retransmission of beam failure recovery request is triggered, until reaching a maximum value. During retransmission, power ramping similar to RACH preamble can be applied, e.g., power ramping can be used if beam failure recovery dedicated resources are in RACH region. Initial access procedure can further be applied to attempt to recover the connection. UE can declare beam failure recovery failure if no NW reaction is observed within a certain time after BFRQ transmission and a maximum number of retransmissions is reached.

Figure 9:
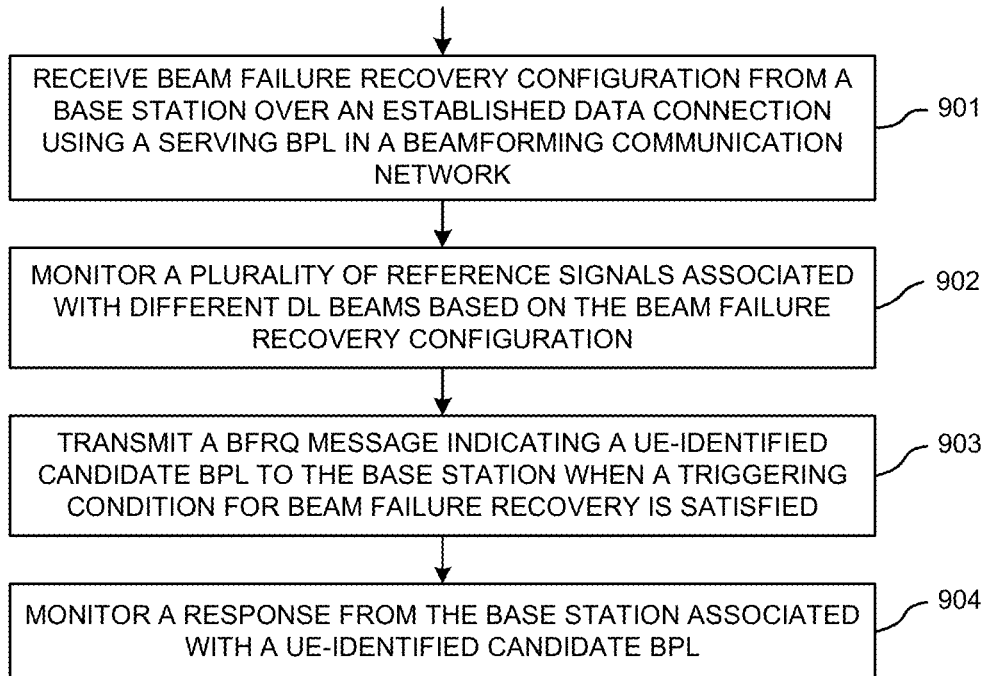
FIG. 9 is a flow chart of a method of beam failure recovery from UE perspective in a beamforming system in accordance with one novel aspect.

FIG. 9 is a flow chart of a method of beam failure recovery from UE perspective in a beamforming system in accordance with one novel aspect. In step 901, a UE receives beam failure recovery configuration from a base station over an established data connection using a serving beam pair link in a beamforming communication network. In step 902, the UE monitors a plurality of reference signals associated with different downlink beams based on the beam failure recovery configuration. In step 903, the UE transmits a beam failure recovery request (BFRQ) message indicating a UE-identified candidate beam pair link to the base station when a triggering condition for beam failure recovery is satisfied. In step 904, the UE monitors a response from the base station associated with the UE-identified candidate beam pair link.

Figure 10:
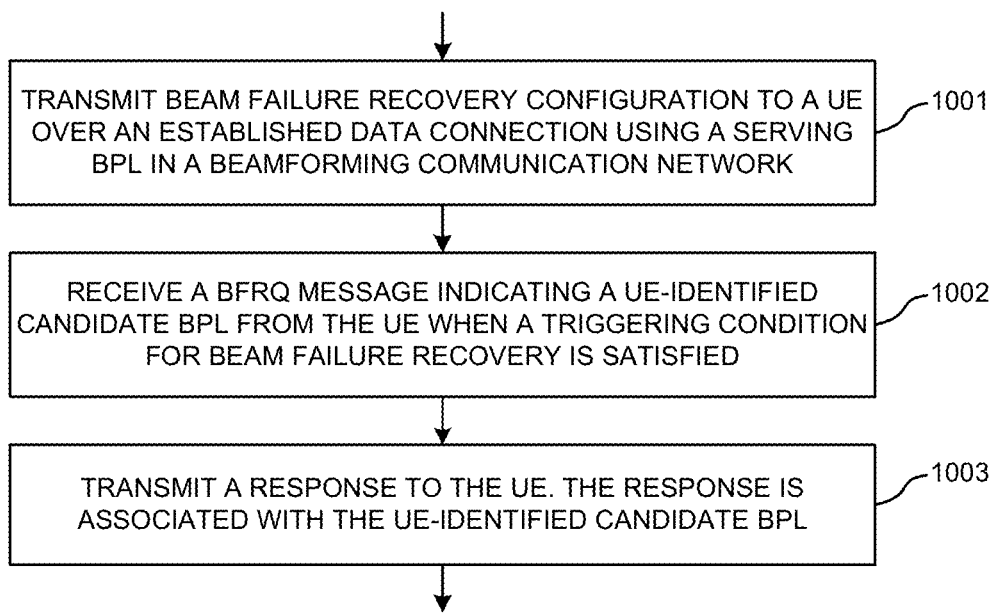
FIG. 10 is a flow chart of a method of beam failure recovery from base station perspective in a beamforming system in accordance with one novel aspect.

FIG. 10 is a flow chart of a method of beam failure recovery from base station perspective in a beamforming system in accordance with one novel aspect. In step 1001, a base station (BS) transmits beam failure recovery configuration to a user equipment (UE) over an established data connection using a serving beam pair link in a beamforming communication network. In step 1002, the BS receives a beam failure recovery request (BFRQ) message indicating a UE-identified candidate beam pair link from the UE when a triggering condition for beam failure recovery is satisfied. In step 1003, the BS transmits a response to the UE. The response is associated with the UE-identified candidate beam pair link.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:
1. A method comprising:
receiving beam failure recovery configuration from a base station by a user equipment (UE) over an established data connection using a serving beam pair link in a beamforming communication network;
monitoring a plurality of reference signals associated with different downlink beams based on the beam failure recovery configuration;
transmitting a beam failure recovery request (BFRQ) message indicating a UE-identified candidate beam pair link to the base station when a triggering condition for beam failure recovery is satisfied, wherein the triggering condition comprises detecting a beam failure of the serving beam pair link(s) for a predefined evaluation period and identifying a candidate beam pair link, wherein the beam failure is detected when a block error ratio (BLER) of the serving beam pair link is below a threshold; and monitoring a response from the base station associated with the UE-identified candidate beam pair link.

2. The method of claim 1, wherein the new candidate beam pair is identified when a reference signal received power (RSRP) of the candidate beam pair link is above a threshold.

3. The method of claim 1, wherein the BFRQ message is sent over a physical random-access channel (PRACH), which is spatially associated with the UE-identified candidate beam pair link.

4. The method of claim 1, wherein the BFRQ message is sent over a physical uplink control channel (PUCCH) associated with the UE-identified candidate beam pair link.

5. The method of claim 1, wherein the UE retransmits the BFRQ message if the UE does not receive the response from the base station.

6. The method of claim 1, wherein the beam failure recovery configuration comprises information on the triggering condition, information on transmitting the BFRQ message, and information on monitoring the response.

7. A user equipment (UE), comprising:
  a radio frequency (RF) receiver that receives beam failure recovery configuration from a base station over an established data connection using a serving beam pair link in a beamforming communication network;
  a beam monitor that monitors a plurality of reference signals associated with different downlink beams based on the beam failure recovery configuration;
  a radio frequency (RF) transmitter that transmits a beam failure recovery request (BFRQ) message indicating a UE-identified candidate beam pair link to the base station when a triggering condition for beam failure recovery is satisfied, wherein the triggering condition comprises detecting a beam failure of the serving beam pair link(s) for a predefined evaluation period and identifying a candidate beam pair link, wherein the beam failure is detected when a block error ratio (BLER) of the serving beam pair link is below a threshold; and
  the beam monitor that monitors a response from the base station associated with the UE-identified candidate beam pair link.

8. The UE of claim 7, wherein the new candidate beam pair is identified when a reference signal received power (RSRP) of the candidate beam pair link is above a threshold.

9. The UE of claim 7, wherein the BFRQ message is sent over a physical random-access channel (PRACH), which is spatially associated with the UE-identified candidate beam pair link.

10. The UE of claim 7, wherein the BFRQ message is sent over a physical uplink control channel (PUCCH) associated with the UE-identified candidate beam pair link.

11. The UE of claim 7, wherein the UE retransmits the BFRQ message if the UE does not receive the response from the base station.

12. The UE of claim 7, wherein the beam failure recovery configuration comprises information on the triggering condition, information on transmitting the BFRQ message, and information on monitoring the response.

13. A method, comprising:
  transmitting beam failure recovery configuration from a base station to a user equipment (UE) over an established data connection using a serving beam pair link in a beamforming communication network;
  receiving a beam failure recovery request (BFRQ) message indicating UE-identified candidate beam pair link from the UE when a triggering condition for beam failure recovery is satisfied, wherein the triggering condition comprises detecting a beam failure of the serving beam pair link(s) for a predefined evaluation period and identifying a candidate beam pair link, wherein the beam failure is detected when a block error ratio (BLER) of the serving beam pair link is below a threshold; and
  transmitting a response from the base station to the UE, wherein the response is associated with the UE-identified candidate beam pair link.

14. The method of claim 13, wherein the beam failure recovery configuration comprises information on the triggering condition, information on transmitting the BFRQ message, and information on monitoring the response.

15. The method of claim 13, wherein the BFRQ message is sent over a physical random-access channel (PRACH) associated with the UE-identified candidate beam pair link.

16. The method of claim 13, wherein the BFRQ message is sent over a physical uplink control channel (PUCCH) associated with the UE-identified candidate beam pair link.

17. The method of claim 13, wherein the response is transmitted by using a dedicated downlink transmission on the UE-identified candidate beam pair link.

* * * * *